(12) United States Patent
Durgan

(10) Patent No.: US 8,135,193 B2
(45) Date of Patent: Mar. 13, 2012

(54) DISPLAYING ANATOMICAL TREE STRUCTURES

(75) Inventor: Jacob S. Durgan, Mayfield Village, OH (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 434 days.

(21) Appl. No.: 12/514,916

(22) PCT Filed: Nov. 9, 2007

(86) PCT No.: PCT/IB2007/054570
§ 371 (c)(1),
(2), (4) Date: May 14, 2009

(87) PCT Pub. No.: WO2008/062338
PCT Pub. Date: May 29, 2008

(65) Prior Publication Data
US 2010/0002928 A1    Jan. 7, 2010

Related U.S. Application Data

(60) Provisional application No. 60/866,442, filed on Nov. 20, 2006.

(51) Int. Cl.
*G06K 9/00* (2006.01)
(52) U.S. Cl. .......................... 382/128; 382/132
(58) Field of Classification Search .................. 382/128, 382/131, 132
See application file for complete search history.

(56) References Cited

U.S. PATENT DOCUMENTS

| | | | | |
|---|---|---|---|---|
| 7,397,942 B2* | 7/2008 | Bruijns | | 382/154 |
| 2005/0256400 A1* | 11/2005 | Raman et al. | | 600/425 |
| 2006/0023925 A1* | 2/2006 | Kiraly et al. | | 382/128 |
| 2006/0025674 A1* | 2/2006 | Kiraly et al. | | 600/410 |
| 2006/0122539 A1 | 6/2006 | Lee et al. | | |
| 2007/0127800 A1* | 6/2007 | Coenen et al. | | 382/128 |
| 2007/0168019 A1* | 7/2007 | Amplatz et al. | | 623/1.18 |
| 2008/0085042 A1* | 4/2008 | Trofimov et al. | | 382/128 |
| 2008/0094389 A1* | 4/2008 | Rouet et al. | | 345/419 |
| 2008/0273777 A1* | 11/2008 | Luboz et al. | | 382/130 |
| 2009/0016588 A1* | 1/2009 | Slabaugh et al. | | 382/131 |
| 2009/0177444 A1* | 7/2009 | Wiemker et al. | | 703/1 |

FOREIGN PATENT DOCUMENTS

WO    2006055031 A2    5/2006

OTHER PUBLICATIONS

Grevera, G. J., et al.; GMIP—Generalized Maximum Intensity Projection; 2004; Proc. of SPIE; 5367(1)636-645.
Kanitsar, A., et al.; Advanced curved Planar Reformation: Flattening of Vascular Structures; 2003; IEEE Visualization; pp. 43-50.
Kanitsar, A., et al.; CPR—Curved Planar Reformation; 2002; IEEE Visualization; pp. 37-44.
Kiraly, A. P., et al.; 2D display of a 3D tree for pulmonary embolism detection; 2005; International Congress Series; 1281:1132-1136.
Silver, D., et al.; Reshaping Medical Volumetric Data for Enhanced Visualization; 2002; Medicine Meets Virtual Reality conf.; vol. 2/10; 488-493.
Subramanyan, K., et al.; Simultaneous Extraction of Centerlines, Stenosis and Thrombus Detection in Renal CT Angiography; 2004; Proc. of SPIE; 5370(1)1474-1485.

* cited by examiner

*Primary Examiner* — Joseph Chang

(57) ABSTRACT

A visualization system including a first component (204) that processes volumetric image data indicative of a curved tubular tree structure having a plurality of branches so that the plurality of branches can be concurrently presented within a display window, wherein the volumetric image data is generated from x-ray projections acquired by a medical imaging system, and a second component (208) that concurrently presents the processed data to display the plurality of branches in a first display window and a region of interest identified on one of the branches in a second display window to present the region of interest in a spatial orientation different then that of the plurality of branches.

20 Claims, 8 Drawing Sheets

DISPLAYING ANATOMICAL TREE STRUCTURES

CROSS REFERENCE TO RELATED APPLICATIONS

This application claims the benefit of U.S. provisional application Ser. No. 60/866,442 filed Nov. 20, 2006, which is incorporated herein by reference.

DESCRIPTION

The present application generally relates to displaying anatomical tree structures. While it finds particular application to displaying a portion of the vascular tree structure for inspection, it also relates to non-medical and other medical applications, including displaying portions of other tubular structures such as the bronchial tubes and the intestines.

A stenosis is an abnormal narrowing or constriction of the diameter of a region of a bodily passage such as a blood vessel or other tubular structure. Generally, a stenosis can occur anywhere along the affected structure, and its consequences depend on the particular structure. For example, renal artery stenosis can lead to atrophy of the affected kidney and eventually renal failure, if not treated. Aortic stenosis can cause syncope, angina and congestive heart failure, all of which can lead to death. According to the literature, aortic stenosis occurs in approximately five (5) out of every ten thousand (10,000) people.

Medical imaging systems, such as a computed tomography (CT) system, are often used to acquire information indicative of vessel anatomy and pathology such as stenosis. With CT systems, x-ray projections that traverse a vessel disposed within an examination region are detected. Projection data is generated from the detected radiation, and the projection data is reconstructed to generate volumetric image data indicative of the scanned vessel.

Visualization software displays the volumetric image data via techniques such as multiplanar reformatting (MPR) so that volume of data or a sub-set thereof can be variously displayed and manipulated by the user. In addition, with such reformatted data the user can generate slices having a desired slice width from the volume of data along an axial, oblique, or curved plane with respect to the volume of data.

For imaging vascular or other tubular anatomical structures, curved-MPR straightens bends in a curved vessel so that the length of the vessel can be entirely visualized within an image or over a series of images. Once the vessel has been straightened, the vessel can be inspected for irregularities such as stenosis and aneurysms. In addition, quantitative measurements such as cross-sectional length and vessel diameter can be performed.

A technique such as maximum-intensity projection (MIP) is often used to enhance the visibility of a vessel with respect to surrounding anatomy as a function of radiodensity through windowing. For instance, with vascular imaging an attenuating contrast agent is often advantageously injected into the circulatory system so that it passes through the vessel of interest while the vessel is scanned. An MIP is then performed to enhance the areas of high radiodensity to virtually extract the vessel of interest from the surrounding imaged anatomy.

Visualization of tubular anatomical structures via medical imaging provides useful, non-invasive information regarding the state of the structure. Unfortunately (and as briefly noted above), vascular structures can exhibit areas of stenosis anywhere along the affected vessel. Thus, the entire vessel commonly has to be inspected. With CT data, this can be time consuming since it requires a user to scroll through a large number of slices. In addition, vessels tend to move in and out of plane due to their inherent curvature. Thus, the user spends additional time interacting or otherwise manipulating the data so that the vessel can be adequately inspected.

Attempts have been made to reduce inspection time and improve visualization through displaying additional representations or views of the vessel. However, introducing additional representations adds complexity, especially if the user has to decide early in the inspection process which vessel to inspect. For example, with one conventional visualization application, the user initially selects a vessel branch to inspect, such as the right renal artery, from a vessel selection application. Using the corresponding data from the volume data set, multiple different representations of the vessel from different spatial orientations are generated and displayed.

These representations typically are displayed in a new display window or replace the vessel selection application within a display window. If the user desires to inspect another vessel branch such as the right common iliac, the user returns to the vessel selection application. The user then selects the right common iliac, and the corresponding data from the volume dataset is used to generate multiple representations or views of the right common iliac for inspection.

As a consequence of selecting individual branches for inspection, inspection of the vessel or other tubular structure generally requires a substantial amount of user interaction and time.

Aspects of the present application address the above-referenced matters and others.

According to one aspect, a visualization system includes a first component that processes volumetric image data indicative of a curved tubular tree structure having a plurality of branches so that the plurality of branches can be concurrently presented within a display window, wherein the volumetric image data is generated from x-ray projections acquired by a medical imaging system, and a second component that concurrently presents the processed data to display the plurality of branches in a first display window and a region of interest identified on one of the branches in a second display window to present the region of interest in a spatial orientation different then that of the plurality of branches.

According to one aspect, a method includes concurrently presenting image data simultaneously showing a plurality of branches of a curved anatomical tubular structure and a region of interest on one of the branches, wherein the region of interest is presented in a spatial orientation different then that of the plurality of branches.

According to one aspect, a computer readable storage medium containing instructions which, when executed by a computer, cause the computer to carry out the steps of concurrently presenting image data simultaneously showing a plurality of branches of a curved anatomical tubular structure and a region of interest on one of the branches, wherein the region of interest is presented in a spatial orientation different then that of the plurality of branches.

According to another aspect, a system includes a means for obtaining a volume of imaging data generated from multiple slices indicative of a tubular tree structure and a means for concurrently presenting the tubular tree structure and a sub-portion of a branch of the tree structure that shows the branch in a different spatial orientation.

Still further aspects of the present invention will be appreciated to those of ordinary skill in the art upon reading and understanding the following detailed description.

The invention may take form in various components and arrangements of components, and in various steps and FIG. 1 illustrates an exemplary imaging system.

Figure 1:
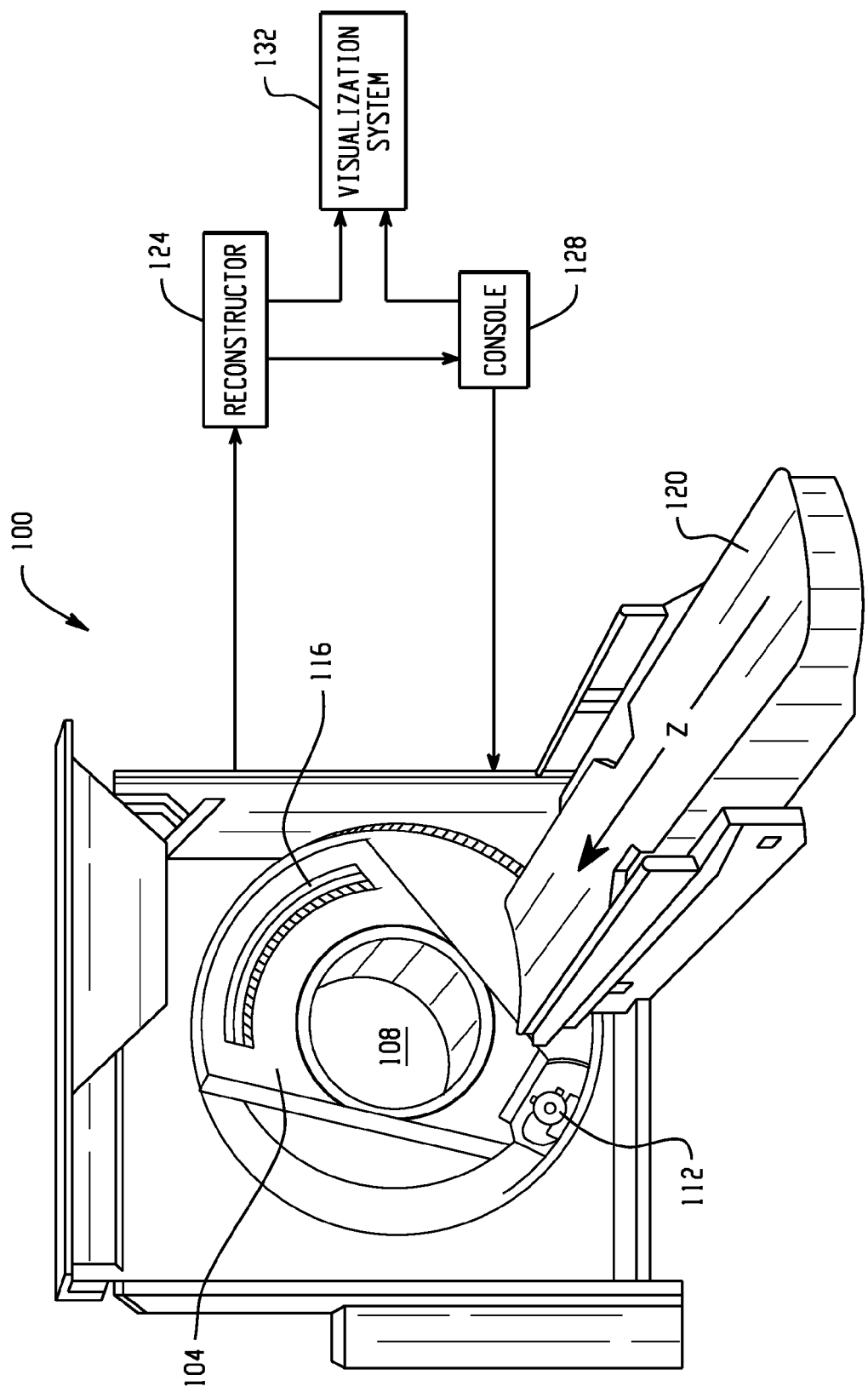

With reference to FIG. 1, a computed tomography (CT) scanner 100 includes a rotating gantry portion 104 which rotates about an examination region 108 around a longitudinal or z-axis.

The rotating gantry portion 104 supports an x-ray source 112, such as an x-ray tube, that generates and emits radiation that traverses the examination region 108 and an object disposed therein.

The rotating gantry portion 104 also supports an x-ray detector 116 that detects radiation emitted by the source 112 that traverses the examination region 108 and object. The x-ray detector 116 generates x-ray projection data indicative of the detected radiation for a plurality of projection angles or views with respect to an examination region 108 over one or more revolutions around the examination region 108. The x-ray detector 116 includes a generally two-dimensional array of detector elements that generate the projection data.

An object support 120 such as a couch supports a patient or other object in the examination region 108. The object support 120 is movable so as to guide the patient or other subject within respect to the examination region 118 while performing a scanning procedure.

A reconstructor 124 reconstructs the projection data to generate volumetric image data. The volumetric image data is indicative of the portion of the object disposed within the examination region 108. In the illustrated implementation, a plurality of successive data acquisitions covering contiguous regions of the object in the longitudinal direction are performed so that the resulting volumetric image data includes data for the scanned extent of the object.

A general purpose computer serves as an operator console 128. The console 128 includes a human readable output device such as a monitor or display and an input device such as a keyboard and mouse. Software resident on the console allows the operator to control and interact with the scanner 100. In one instance, the interaction includes selecting an imaging protocol, setting imaging parameters, beginning, pausing and terminating scanning, as well as other interaction, for example, through a graphical user interface (GUI).

A visualization system 132 displays the volumetric image data. In one instance, the visualization system 132 warps or otherwise processes this data so that the scanned portion of the arterial tree lies within a relatively thin volume that is rendered within a viewing window. The visualization system 132 essentially unwinds the curved portions of the arterial tree so that a substantial part of or the entire tree is within a thin slab presented in the viewing window. This allows the user to inspect any or all the branches of the arterial tree for abnormalities such as stenosis without further user interaction such as scrolling through or rotating the displayed structure until a desired portion of a branch becomes visible.

The visualization system 132 concurrently presents information related to portions of a selected region of interest on a branch through views shown in different spatial orientations. By presenting the data so that the user is able to concurrently inspect multiple branches and concurrently obtain more information about any particular region of any branch, inspection time and user interaction may be decreased relative to a configuration in which the individual branches of the vessel are independently selected, presented, and inspected.

Figure 2:
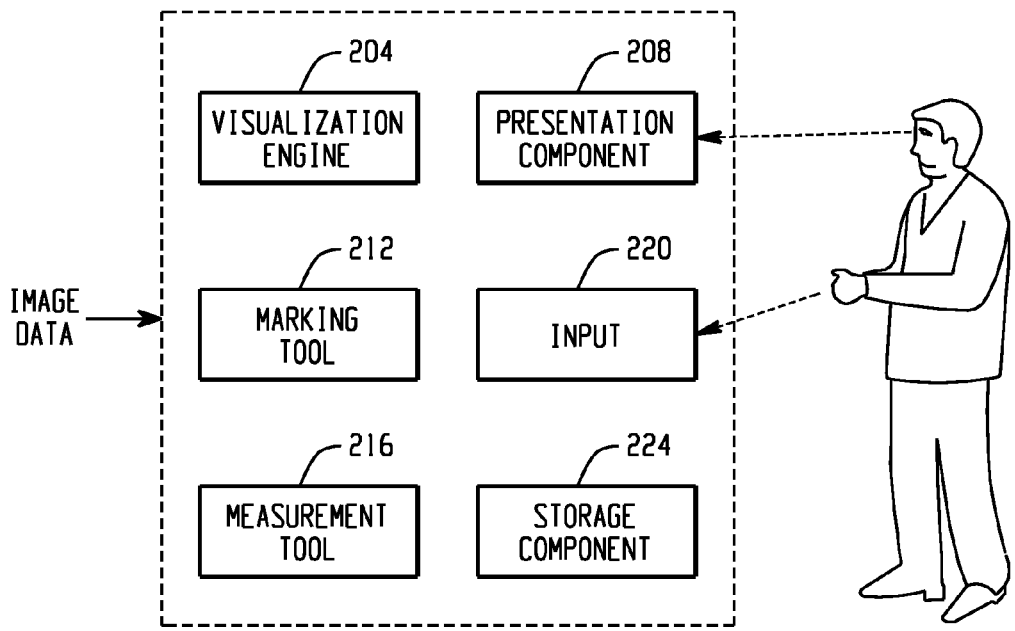
FIG. 2 illustrates an exemplary visualization system.

As shown in FIG. 2, in one implementation the visualization system 132 includes a visualization engine 204 that processes the volumetric image data to form various datasets. For instance, the visualization engine 204 processes the image data to generate a multiplanar reformatted (MPR), a curved MPR, a straightened MPR, and a cross sectional dataset. The visualization engine 204 also generates datasets based on other techniques, for example, a maximum intensity projection (MIP) technique.

A presentation component 208 presents the datasets to the user within multiple regions of a display. For instance, the presentation component 208 may present an MPR in a coronal view in one display region, a straightened MPR in another display region, and one or more cross sectional views in another display region. As described in greater detail below, the data is presented in either a local rotation or a slab mode. The presentation engine 208 also updates a display region as a structure rotates, moves, or is otherwise manipulated.

A marking tool 212 is used to identify a region(s) of interest. In one instance, marking a region of interest automatically invokes the display of more detailed information about the marked region through different views of the marked region. In another instance, multiple regions are marked or identified for subsequent inspection.

A measurement tool 216 provides a mechanism to make various measurements. For example, the measurement component 216 can be used to measure relative a CT number, radiodensity or various dimensions such as the diameter of a vessel.

An input component 220 such as a keyboard, mouse, or the like allows a user to interact with the system 132. Examples of suitable interaction includes selecting a dataset or a sub-portion thereof for inspection, toggling between a local rotation and slab mode, activating and deactivating cine mode, manually rotating anatomy, manually scrolling through anatomy, identifying regions of interest for further inspection, saving inspection results, generating an inspection report, making various measurements.

A storage component 224 includes memory for term storage of volume data sets and dynamic memory for manipulating data during inspection.

Figure 3:
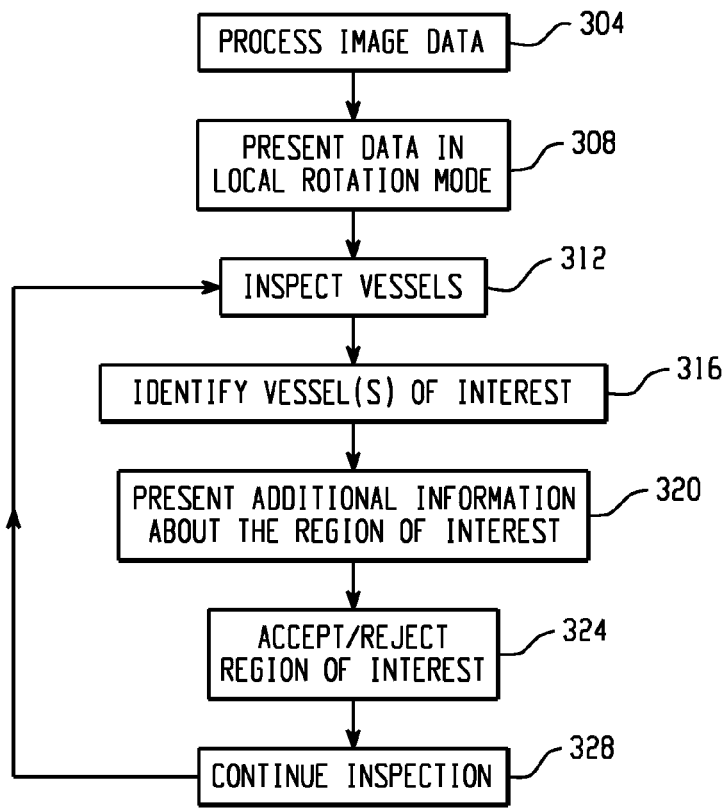
FIG. 3 illustrates an exemplary method using a local rotation mode.

FIG. 3 provides an exemplary method for presenting an anatomical tubular structure of interest to a user for inspection.

At reference numeral 304, volumetric image data is processed using a multiplanar reformatting (MPR) or other reformatting technique. The image data is retrieved from the term storage of the storage component 224 or the system 100 and loaded into the dynamic memory of the storage component 224 where it can be manipulated to form the volume data set. An application executing within the visualization system 132 allows the user to select an entire image data set or a sub-set thereof.

Figure 4A:
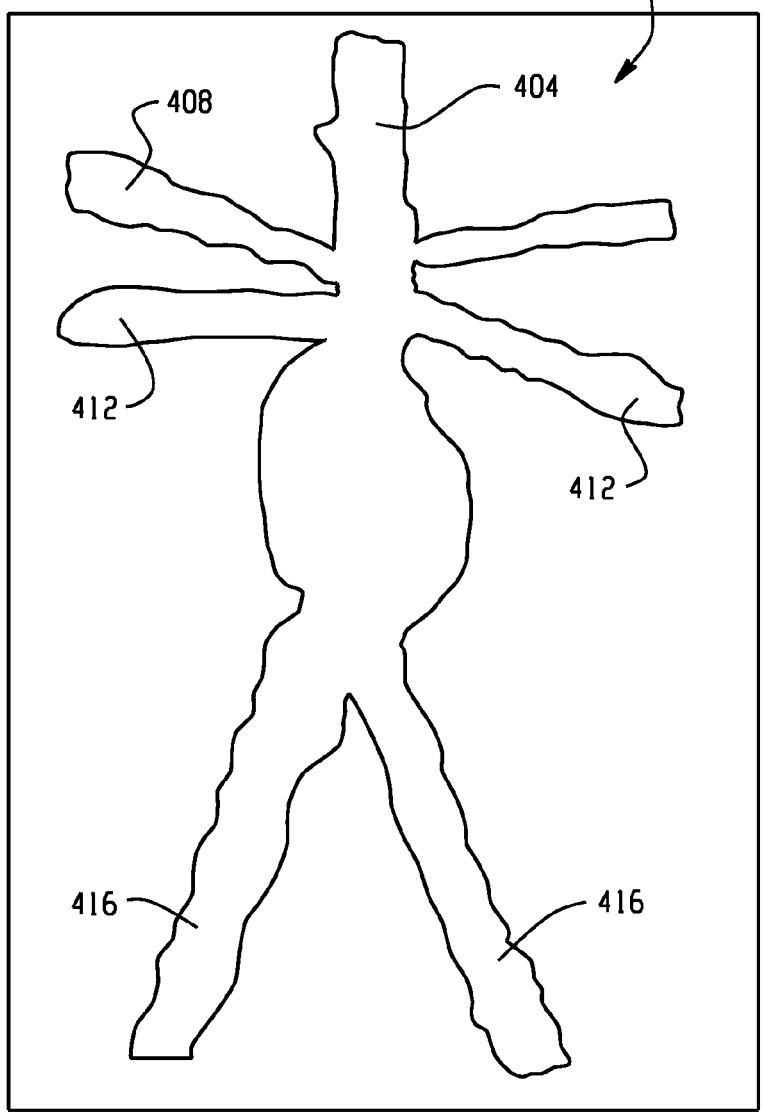
FIG. 4 illustrates exemplary views of a warped vascular tree structure.
Figure 4C:
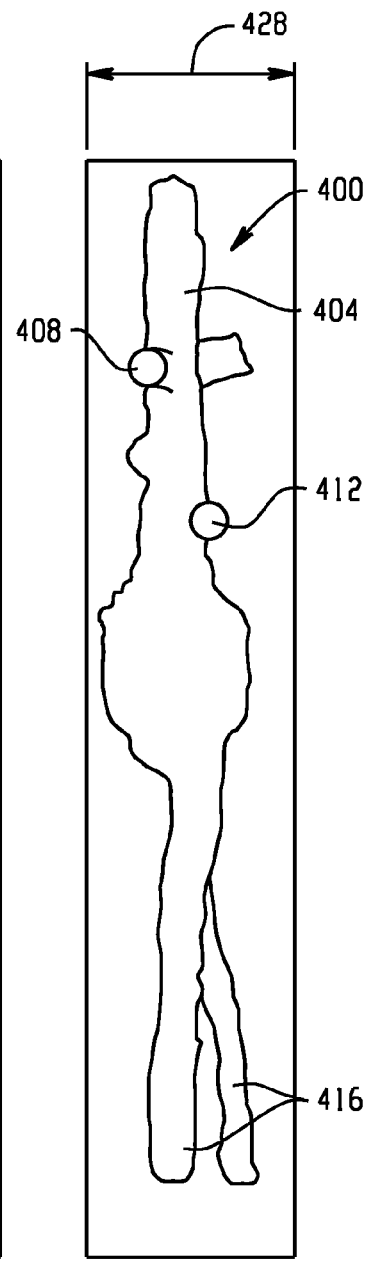
Figure 4B:
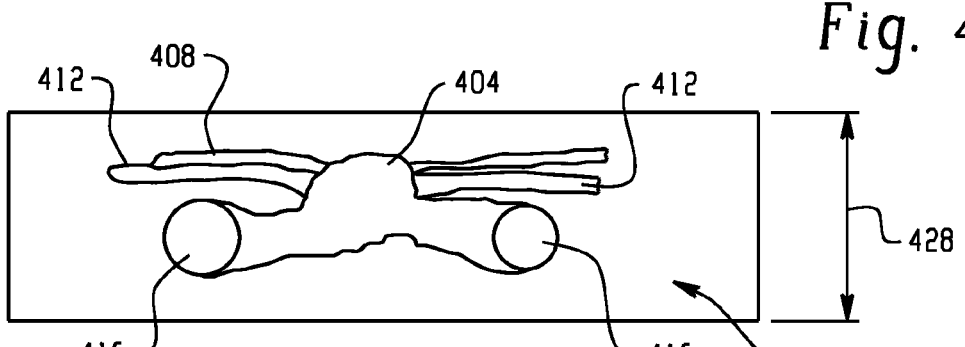

As noted above, the data is processed to generate a warped data set in which a desired anatomical tree structure lies within a volume having a finite non-zero thickness that is displayed so that the branches of the tree are concurrently visible. FIGS. 4(a), (b) and (c) shows examples of different views (coronal, transverse, and sagittal, respectively) of such a warped dataset from different planes for a portion of the arterial tree 400 that includes portions of the aorta 404, the superior mesenteric artery (SMA) 408, the renal arteries 412, and the common iliac arteries 416. In this example, the planes are orthogonal planes. However, non-orthogonal planes are also contemplated herein. FIGS. 4(b) and (c) shows that the arterial tree 400 is warped to lie within a thickness 428.

Figure 5:
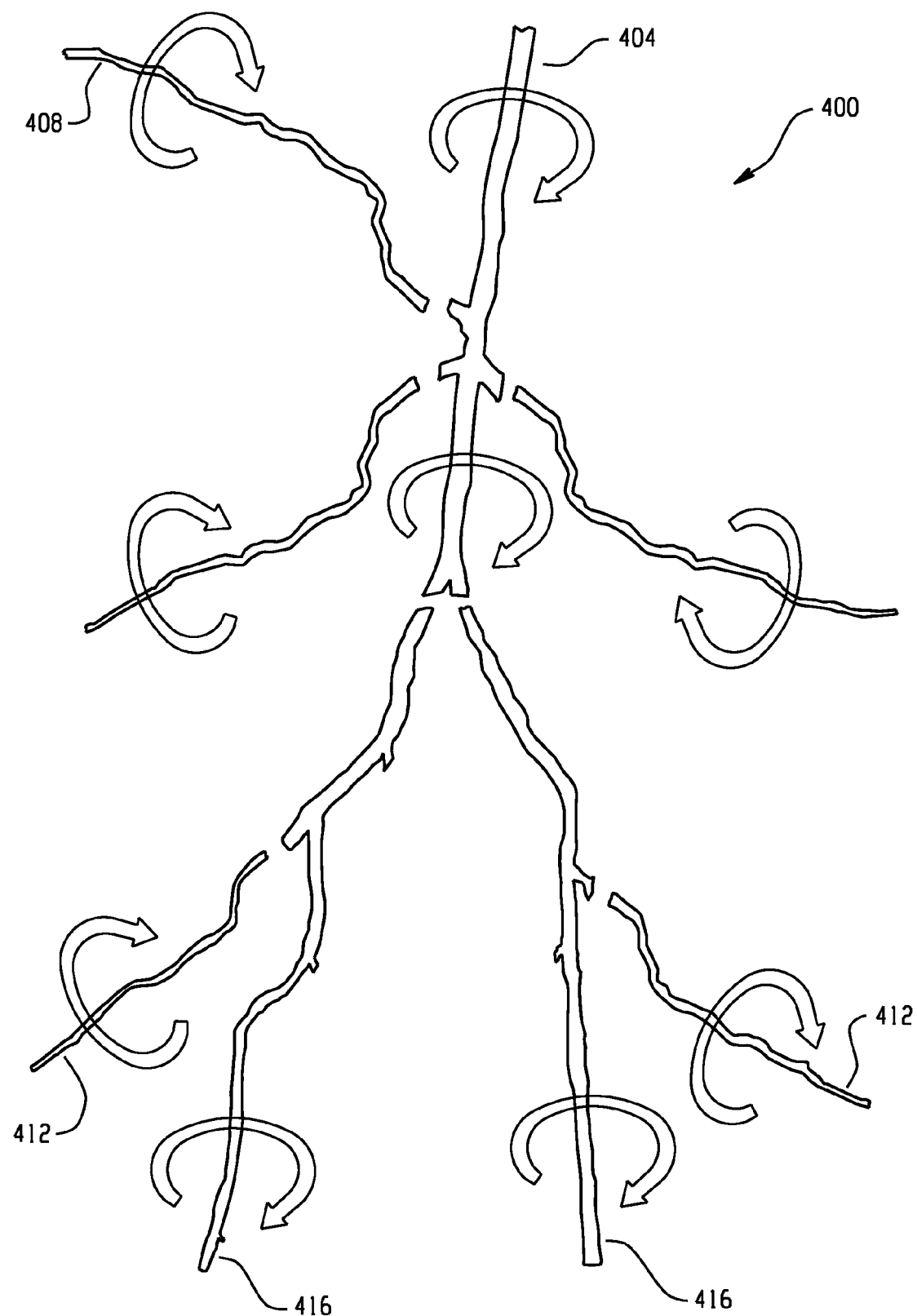
FIG. 5 illustrates an exemplary disjointed vascular tree structure.

Returning to FIG. 3, at 308 the processed image data is presented in a local rotation mode. In this mode, each vessel branch is disjointed from the arterial tree 400 and independently rotated. FIG. 5 provides an example of such rendering for the arterial tree 400. Note that FIG. 5 is generated using a maximum-intensity projection (MIP) technique that enhances the visibility of a arterial tree relative to the surrounding scanned anatomy.

As depicted in FIG. 5, each vessel branch 404-416 is disjointed from the arterial tree at a bifurcation. Disjointing the vessel branches as such allows the each branch and the bifurcated regions to be visualized as each branch rotates. In the illustrated implementation, the vessel branches are disjointed and displayed such that portions of each segmented branch overlap portions of the arterial tree at the corresponding bifurcation. This facilitates mitigating obscuring a potential area of interest, for example, where a region of interest lies at the bifurcation.

Figure 6:
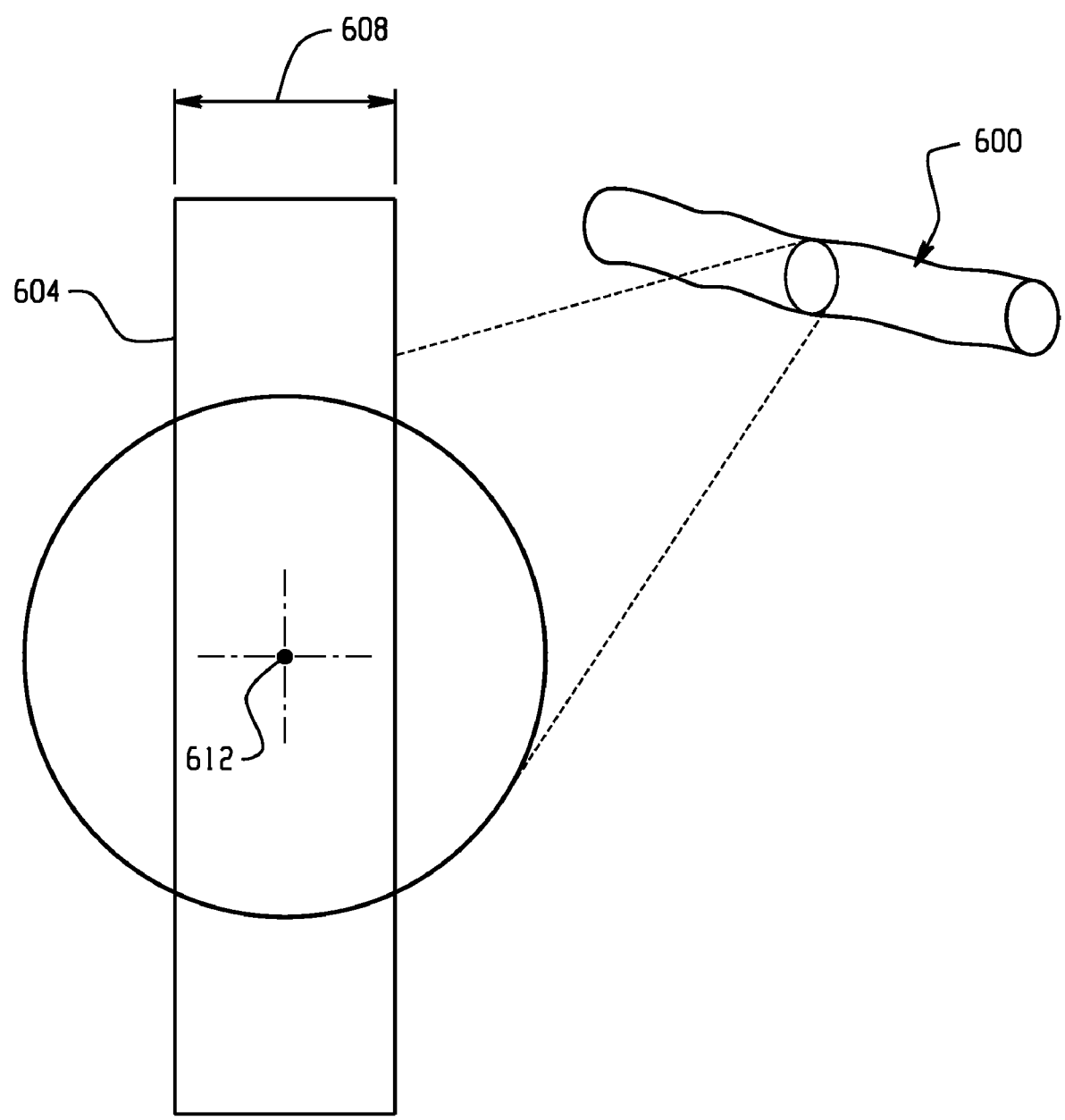
FIG. 6 illustrates an exemplary disjointed vessel rotation technique.

Each disjointed branch 404-416 rotates about a corresponding centerline. FIG. 6 illustrates such rotation for a branch 600. A slab 604 having a configurable thickness 608 is positioned relative to a centerline 612 of the branch 600. The slab 604 rotates about this centerline 612. In FIG. 4, each vessel branch 404-416 rotates about a corresponding slab with respect to a respective centerline. It is to be appreciated that the angle of rotation about the centerline is adjustable.

In the illustrated example, cine mode is automatically activated upon loading the volumetric image data. As a result, the branches 404-416 are automatically disjointed and automatically rotate about corresponding centerlines as shown in FIG. 5. The user can de-activate or resume cine mode at any time during inspection.

Returning to FIG. 3, at 312 the user visually inspects or otherwise observes one or more of the disjointed vessel branches.

At 316, the user identifies a region of interest within a vessel branch that the user desires to inspect in greater detail. In one implementation, the user identifies such a region by clicking on the region with a mouse pointer or other pointing device. A rotating branch typically is first stopped or paused before the region on the branch is marked.

Figure 7:
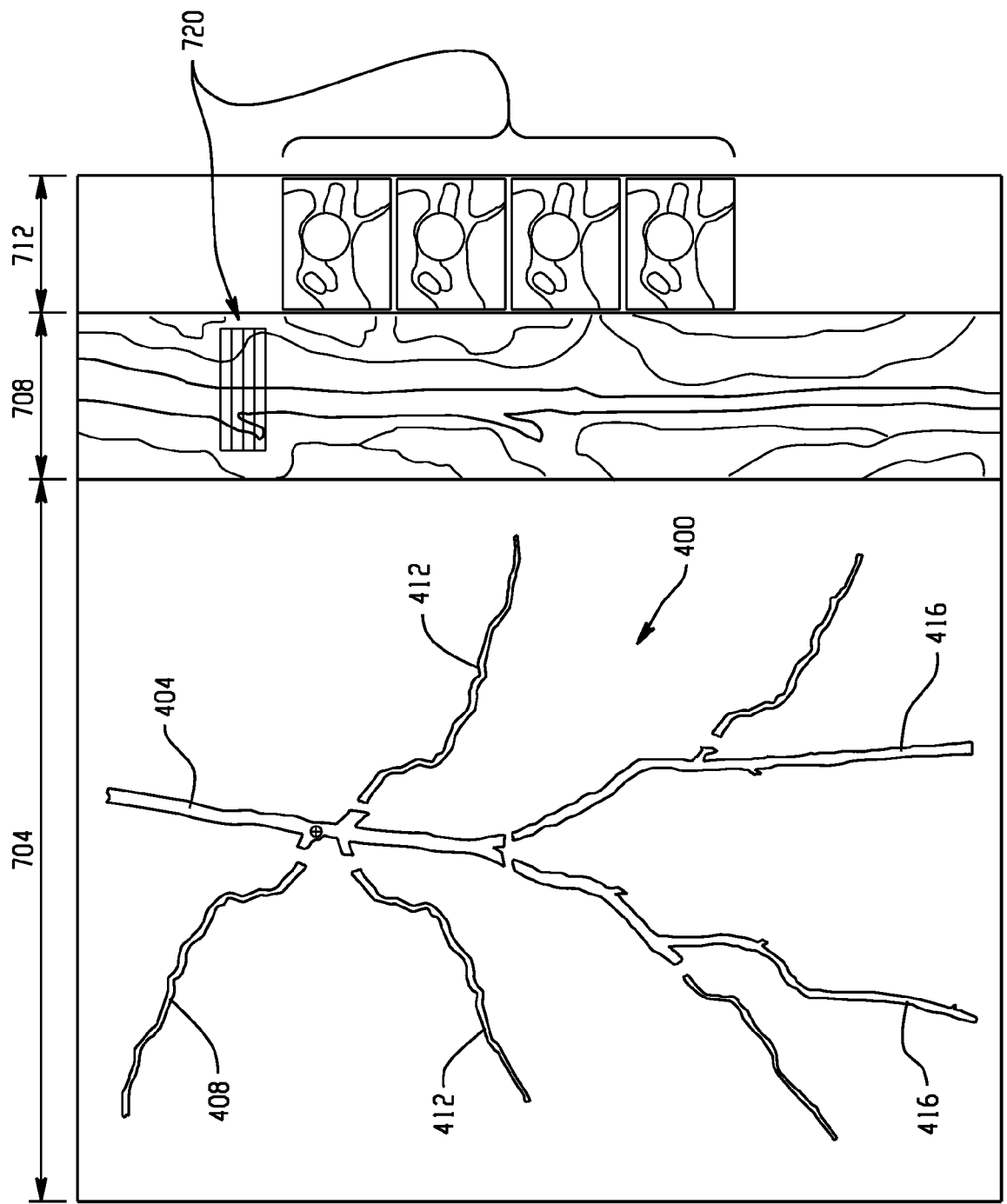
FIG. 7 illustrates an exemplary display of the vascular tree.

At 320, additional information is presented for an identified region of interest. In one instance, the additional information includes additional views from different orientations showing the region of interest in greater detail. An example is depicted in FIG. 7, which shows the arterial tree 400 in local rotation in a first viewing window 704, an identified region of interest 708 on the arterial tree, a straightened multi-planar reconstruction of the subject branch in a second viewing window 712, and a plurality of cross sectional views in a third viewing window 716.

The plurality of cross-sectional views includes slices showing the identified region of interest 708 and areas next to the identified region of interest 708. For example, as depicted slices 720 having a desired thickness are defined with respect to the straightened multi-planar reconstruction view in the window 712. The illustrated example shows five contiguous slices, each having a two (2) millimeter (mm) thickness. However, it is to be appreciated that more or less slices and a different thickness can be set. The slices are rendered in the cross sectional views in the window 716.

At 324, the user accepts or rejects the region of interest to indicate whether the region of interest should continue to be identified or not. In either instance, a report, list, or other information regarding the region of interest and inspection thereof is generated to memorialize the findings.

At 328, local rotation mode is resumed and the user either inspects one or more of the vessel branches or selects another identified region of interest for further inspection.

The above discussion relates to local rotation mode. In the example discussed next in connection with FIG. 8, the data is alternatively presented to the user in a slab mode.

At 804, volumetric image data is obtained as described above.

At 808, the volumetric image data is warped or otherwise processed so that the scanned vessel is flattened into a relatively thin window that is presented as a continuous visible structure as shown in FIGS. 4(a), (b), and (c) above. Since the arterial tree is not disjointed, the branches of the vessels naturally interest at the branch bifurcation regions.

Figure 9A:
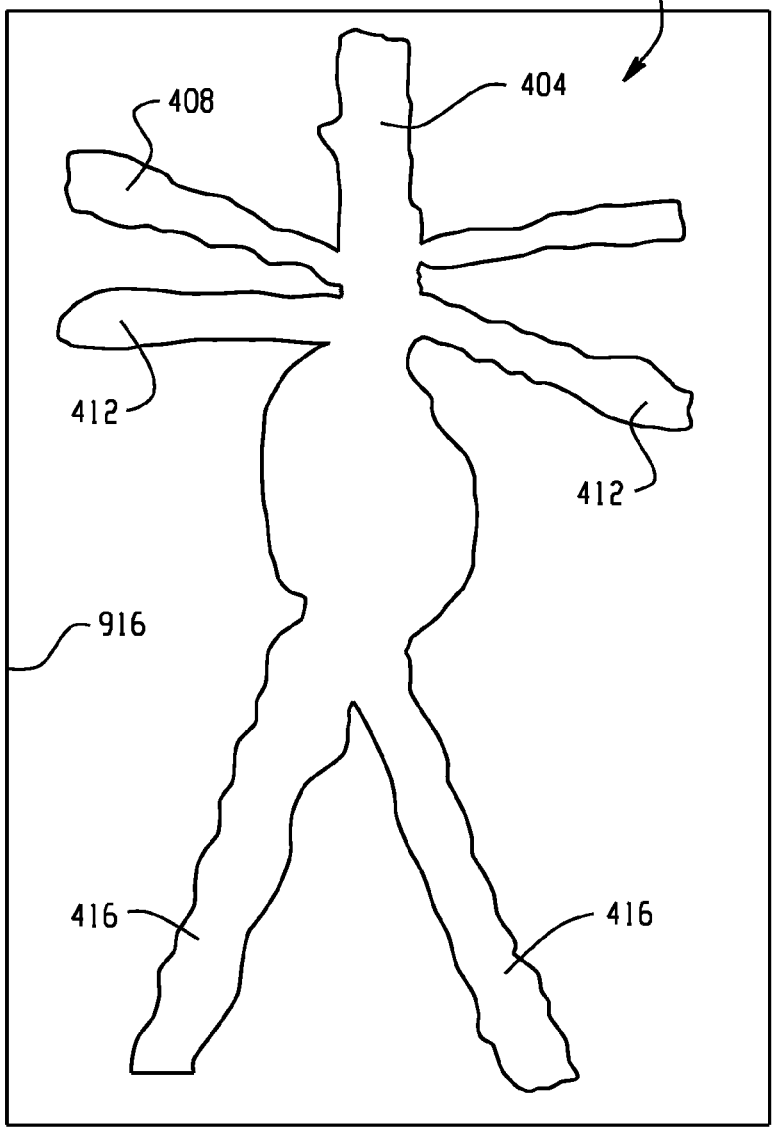
FIG. 9 illustrates an exemplary approach viewing data in slab mode.
Figure 9C:
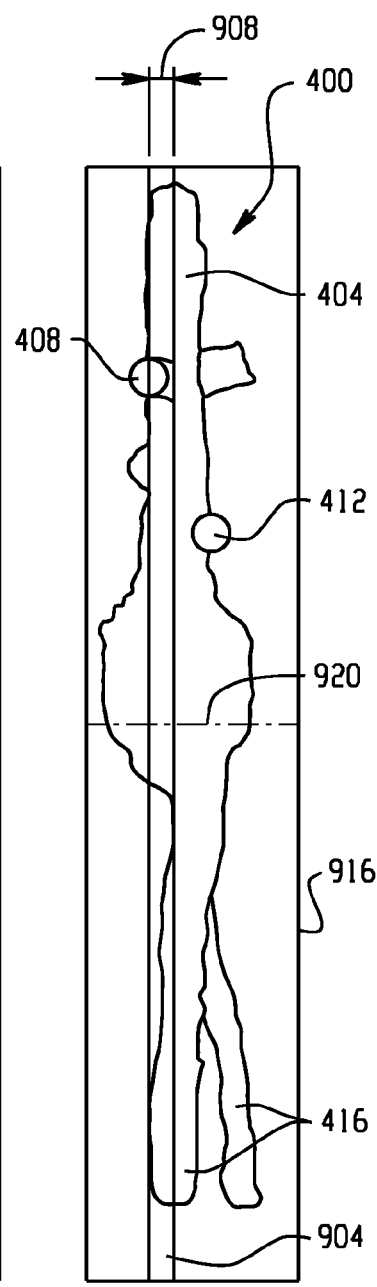
Figure 9B:
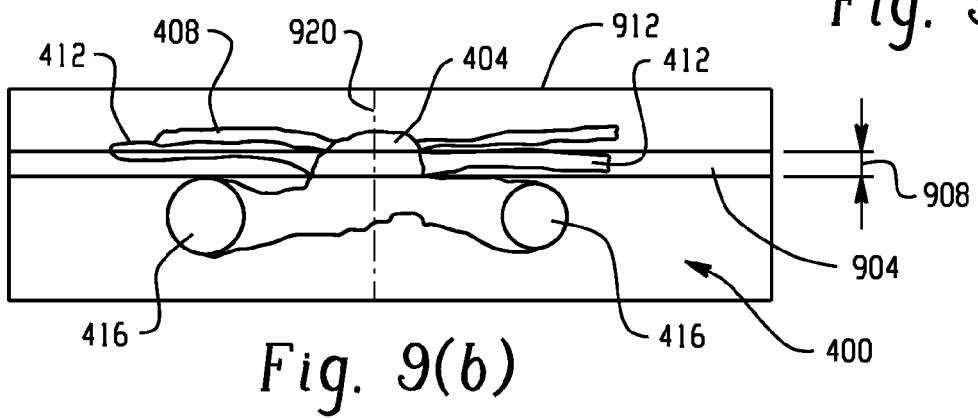

At 812, the data within the window is inspected. As shown in FIG. 9, in slab mode a slab 904 having a user defined and adjustable thickness is superimposed over the window in a first or transverse view 908 and a second or sagittal view 912. The volume within the slab 904 defines the data that is presented to the user in a third or coronal view 916.

The slab 904 scrolls back and forth along an axis 920 to scroll through the volume of data. As the slab 904 scrolls, the portion of the vessel 400 within the slab 904 changes, and the third view 916 is updated to reflect the portion within the slab 904.

Similar to local rotation mode, cine mode is automatically activated upon loading the volumetric image data. As a result, the slab 904 automatically scrolls through the data and the third view 916 continuously updates to reflect the data within the slab 904. Upon reaching the end of the volume, the slab is positioned back or loops back to its starting location and scrolls through the data again. The user can de-activate or resume cine mode at any time during inspection.

Returning to FIG. 8, at 816, the user identifies a region of interest. As with local rotation mode, if cine mode is active, cine mode is paused or deactivated so that the user can mark a region for further inspection.

At 820, additional information regarding a particular region of interest is shown in different spatial orientations as described above.

At 824, the user indicates whether the region of interest should still be identified as a region of interest.

At 828, slab mode is resumed and the user either inspects one or more of the vessel branches or selects another identified region of interest for further inspection.

It is to be appreciated that the user can switch between local rotation and slab mode during inspection.

Variations are now described.

It is to be appreciated that either local rotation mode or slab mode can be set as the default. Alternatively, the system can be configured to prompt the user for the desired mode.

In FIG. 3, cine mode for local rotation mode is automatically invoked upon loading the image data. In an alternative embodiment, the user selects which branches to disjoint and controls the rotation. For instance, in one implementation the vessel is displayed in a non-disjointed state. The user hovers a mouse over or clicks on a branch to disjoint that branch.

Further hovering or clicking controls the rotation of the disjointed branch. The user can activate cine mode at any time during inspection.

Figure 8:
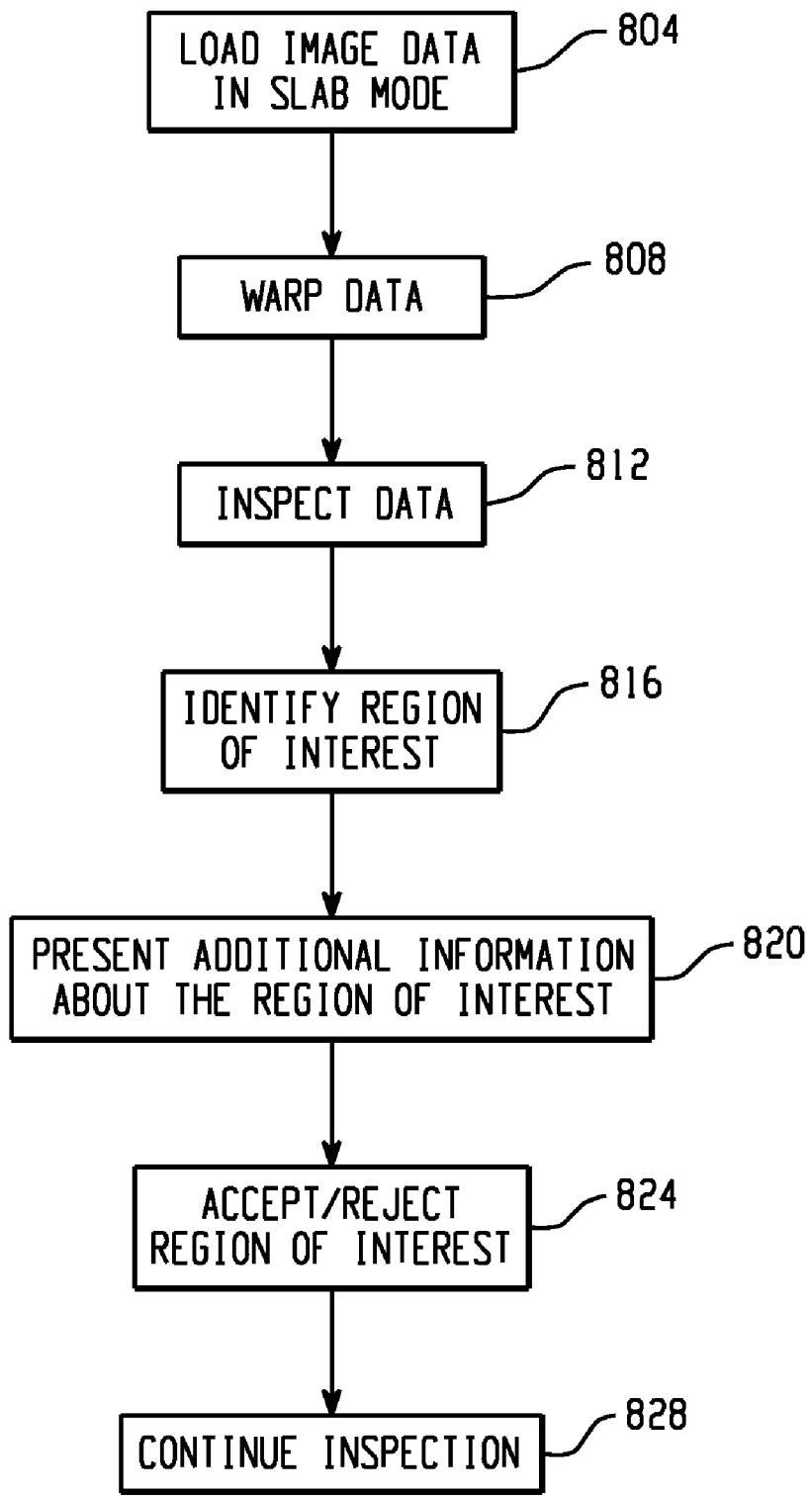
FIG. 8 illustrates an exemplary method using a slab mode

Similarly, in FIG. 8 cine mode for slab mode is automatically invoked upon loading the image data. In an alternative embodiment, the user moves the slab 904 through the volume. The user can activate cine mode at any time during inspection.

It is to be appreciated that the user can switch between local rotation and slab modes at any time during inspection.

A plurality of regions of interest can be identified using either or both modes for subsequent inspection.

In FIG. 7, additional views 712 and 716 are presented to provide additional information through a straightened MPR view and cross sectional views. It is to be appreciated that where the view 704 includes a straightened MPR view, the additional straightened MPR view 712 is not generated and presented.

It is to be appreciated that in an alternative embodiment the console 128 and the visualization system 132 are the same system.

The visualization system 132 may be implemented by way of computer readable instructions which, when executed by a computer processor(s), cause the processor(s) to carry out the described techniques. In such a case, the instructions are stored in a computer readable storage medium associated with or otherwise accessible to the relevant computer.

The described techniques need not be performed concurrently with the data acquisition. For example, the visualization system 132 may be located remotely from the scanner 100 and accesses the relevant data over a suitable communications network such as a HIS/RIS system, PACS system, the internet, or the like.

Applications of the forgoing and variations thereof include, but are not limited to, other imaging modalities such as magnetic resonance (MR) imaging and other tubular structures.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A visualization system, comprising:
a first component that processes volumetric image data indicative of a curved tubular tree structure having a plurality of branches so that the plurality of branches can be concurrently presented within a display window, wherein the volumetric image data is generated from x-ray projections acquired by a medical imaging system; and
a second component that concurrently presents the processed data to display the plurality of branches in a first display window and a region of interest identified on one of the branches in a second display window to present the region of interest in a spatial orientation different then that of the plurality of branches, wherein the plurality of branches can be concurrently presented within a display window in at least one mode, wherein the at least one mode includes:
(i) a local rotation mode in which each branch of the curved tubular tree structure is disjointed from the curved tubular tree structure at a corresponding bifurcation and is independently rotatable with respect to the other disjointed branches about a corresponding axis; and
(ii) a slab mode in which a slab having a user-defined and adjustable thickness is superimposed over transverse view and sagittal view of the curved tubular tree structure, the slab defining the data that is presented in a coronal view of the curved tubular tree structure.

2. The system of claim 1, wherein the tree structure is flattened so that a substantial portion of the tree structure is visible in the first display window.

3. The system of claim 1, wherein the branches are simultaneously presented in the first display window for concurrent inspection.

4. The system of claim 1, further including a third component that allows a user to mark a region of interest on the curved tubular tree structure.

5. The system of claim 4, wherein marking the region of interest automatically invokes the presentation of the marked region of interest in the second display window.

6. The system of claim 1, wherein the tree structure represents a scanned portion of the vascular tree of a patient that includes portions of the aortic artery, the superior mesenteric artery, the renal arteries, and the common iliac arteries.

7. The system of claim 1, wherein hovering a pointer device over a part of a branch within the tree structure disjoints the branch from the tree structure.

8. The system of claim 1, wherein the volumetric image data is processed using a multiplanar reformatting technique and the region of interest is presented in one or more cross-sectional views.

9. The system of claim 1, wherein the branches are inspected for at least one of a stenosis and an aneurysm.

10. The system of claim 1, wherein the branch including the region of interest is presented in a straightened multiplanar reformatted view.

11. A method, comprising:
concurrently presenting image data simultaneously showing a plurality of branches of a curved anatomical tubular structure and a region of interest on one of the branches, wherein the region of interest is presented in a spatial orientation different then that of the plurality of branches, wherein the curved anatomical tubular structure can be concurrently presented within a display window in at least one mode, wherein the at least one mode includes:
(i) a local rotation mode in which each branch of the curved anatomical tubular structure is disjointed from the curved anatomical tubular structure at a corresponding bifurcation and is independently rotatable with respect to the other disjointed branches about a corresponding axis: and
(ii) a slab mode in which a slab having a user-defined and adjustable thickness is superimposed over transverse view and sagittal view of the curved anatomical tubular structure, the slab defining the data that is presented in a coronal view of the curved anatomical tubular structure.

12. The method of claim 11, further including:
individually rotating each branch of the curved anatomical tubular structure about a corresponding centerline;
inspecting each branch as it rotates; and
identifying the first region of interest on the branch.

13. The method of claim 12, further including:
identifying a second region of interest on a branch of the tree structure; and selecting either the first or the second region of interest to display along with the plurality of branches.

14. The method of claim 11, further including generating a report that includes information representative of identified regions of interest.

15. The method of claim 11, wherein each branch is segmented to include overlapping anatomy of a related branch.

16. The method of claim 11, wherein the first region of interest includes a suspected abnormality within the curved anatomical tubular tree structure.

17. A computer readable storage medium containing instructions which, when executed by a computer, cause the computer to carry out the method of claim 11.

18. A system, comprising:
   means for obtaining a volume of imaging data generated from multiple slices indicative of a tubular tree structure; and
   means for concurrently presenting the tubular tree structure and a sub-portion of a branch of the tree structure that shows the branch in a different spatial orientation, wherein the tree structure can be concurrently presented within a display window in at least one mode, wherein the at least one mode includes:
   (i) a local rotation mode in which each branch of the tree structure is disjointed from the tree structure at a corresponding bifurcation and is independently rotatable with respect to the other disjointed branches about a corresponding axis; and
   (ii) a slab mode in which a slab having a user-defined and adjustable thickness is superimposed over transverse view and sagittal view of the tree structure, the slab defining the data that is presented in a coronal view of the tree structure.

19. The system of claim 18, further including means for concurrently inspecting a plurality of branches of the tree structure.

20. The system of claim 18, further including means for identifying a region of interest within the branch of the tree structure.

* * * * *